United States Patent [19]

Chiarella

[11] Patent Number: 4,999,068
[45] Date of Patent: Mar. 12, 1991

[54] METHOD FOR MAKING AN ANATOMICAL MULTILAYER BICYCLE-TYPE SEAT

[76] Inventor: Michele A. Chiarella, Via Vall'Orba 22, Lugano, Switzerland

[21] Appl. No.: 270,968

[22] Filed: Nov. 14, 1988

Related U.S. Application Data

[60] Division of Ser. No. 86,236, Aug. 10, 1987, Pat. No. 4,815,361, which is a continuation of Ser. No. 833,332, Feb. 24, 1986, abandoned, which is a continuation-in-part of Ser. No. 794,302, Nov. 1, 1985, abandoned.

[51] Int. Cl.$^5$ .......................... B32B 31/14; B32B 5/18
[52] U.S. Cl. ......................................... 156/78; 5/449;
5/481; 156/145; 156/146; 156/245; 156/292;
264/45.1; 264/279; 264/279.1; 297/214;
297/DIG. 1; 297/DIG. 2; 428/71; 428/76;
428/320.2; 428/322.7
[58] Field of Search ....................... 5/449, 481; 156/78,
156/145, 146, 70, 245, 292; 264/45.1, 248, 279,
279.1; 297/214, DIG. 1, DIG. 2; 428/71, 76,
320.2, 322.7

[56] References Cited

U.S. PATENT DOCUMENTS

| | | | |
|---|---|---|---|
| 3,604,748 | 9/1971 | Lamkemeyer | 297/214 |
| 3,663,973 | 5/1972 | Spence | 5/451 X |
| 3,997,214 | 12/1976 | Jacoiss | 297/214 |
| 4,012,072 | 5/1977 | Hansen | 297/214 X |
| 4,370,768 | 2/1983 | Saloff | 5/451 X |
| 4,471,538 | 9/1984 | Pomeranz | 297/214 X |

Primary Examiner—Robert A. Dawson
Attorney, Agent, or Firm—Nicholas L. Coch; Walter G. Marple, Jr.; Shahan Islam

[57] ABSTRACT

An anatomical multilayer seat for use on a bicycle or the like. The seat comprises a formed substantially rigid shell covered by a flexible cover sheet and having a layer of soft encapsulated gel material provided between the cover shell and the seat shell. The encapsulated gel layer is constrained against any appreciable lateral movement while permitting only limited deflection of the gel during use by a lower formed foam layer provided between the shell and the cover sheet to produce a controlled graduated support for the rider. If desired, a second upper layer of a resilient material can be advantageously provided between the gel layer and the cover sheet of the seat for encapsulating the gel layer. The invention also includes a method for making the anatomical multilayer seat.

10 Claims, 3 Drawing Sheets

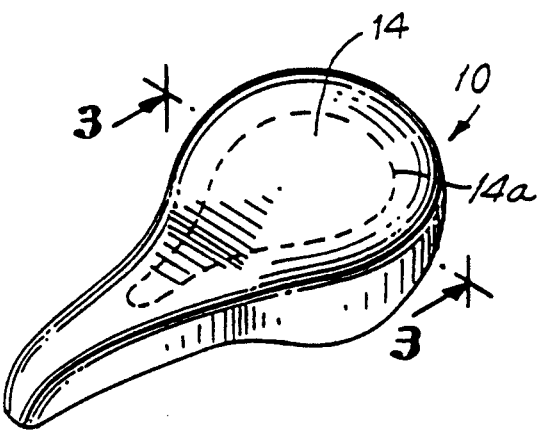
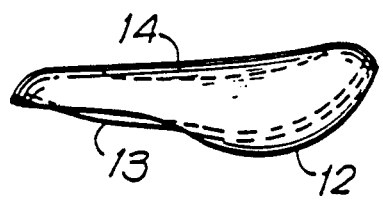
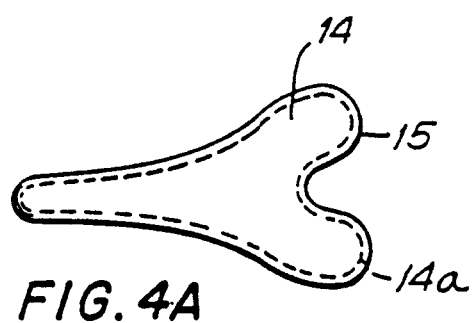
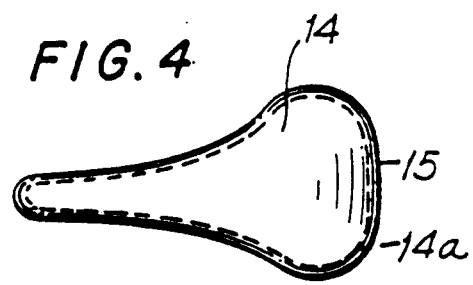
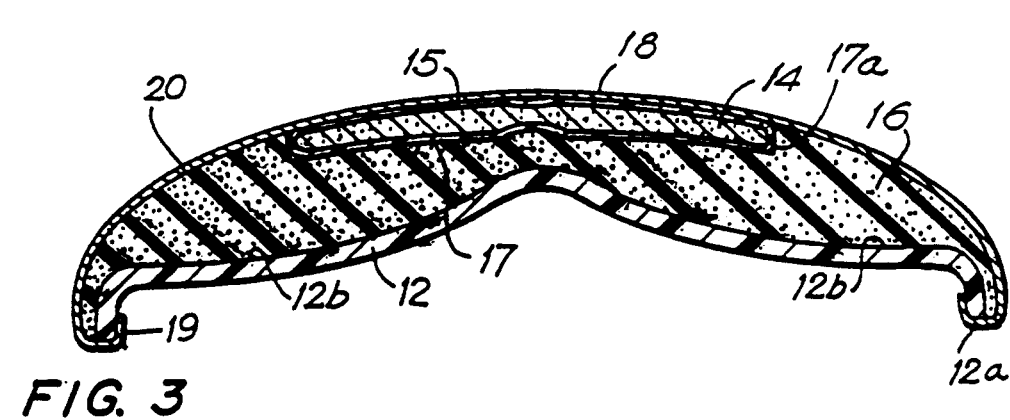

4,999,068

METHOD FOR MAKING AN ANATOMICAL MULTILAYER BICYCLE-TYPE SEAT

CROSS REFERENCE TO RELATED APPLICATIONS

This application is a division of application Ser. No. 086,236, filed Aug. 10, 1987, now U.S. Pat. No. 4,815,361 issued Mar. 28, 1989 which is a continuation of application Ser. No. 833,332 filed Feb. 24, 1986, now abandoned, which is a continuation-in-part of application Ser. No. 794,302 filed Nov. 1, 1985, now abandoned.

This application is a Continuation-In-Part of my application Ser. No. 794302, filed Nov. 1, 1985 and constrained laterally by a layer of plastic foam material. The invention relates to an improved anatomical multilayer bicycle seat. It relates particularly to such a bicycle seat containing an encapsulated gel layer located between a support shell and a cover sheet, and also includes a method for making the anatomical multilayer seat.

Because of the recent increases in bicycle riding and particularly long distance riding of bicycles, increased attention has been directed to the construction of bicycle seats for providing improved comfort for the rider. Over the years, various seat construction materials have been used, including seats having a rigid formed metal or molded plastic lower shell covered by a leather or plastic sheet material. Recently various padded seat configurations have been introduced into the market place or have been disclosed in patents which are based on the concept of avoiding or relieving pressures to the ischial bone ends of the rider's body by omitting padding thereunder as shown in Fauolhaber U.S. Pat. No. 3,185,522; by permitting such padding to move downwardly into a cavity as shown in Young U.S. Pat. No. 3,844,611; or by varying the thickness of the shell or padding as shown in Jacobs U.S. Pat. No. 4,098,537 and Hoffacher U.S. Pat. No. 4,218,909. However, these prior art seats have generally not provided sufficient comfort for the rider, especially when the seat is used in long distance bicycle riding. It is believed that these prior art bicycle seats have been uncomfortable because the means used to avoid or relieve the pressure in the sensitive areas has caused the distribution of excessive pressure to the surrounding areas, as well as other reasons inherent in each of the prior art attempts to solve this long standing problem.

Saddle pads have also been introduced in the marketplace or disclosed in patents. Such pads are attached on top of conventional seats. A pad for attachment onto a seat structure is disclosed in Jacobs U.S. Pat. No. 3,997,214, in which a thixothropic material is used in some areas together with a foamed material in other areas which conforms to the individual cyclist's body configuration and retains the shape formed between usages. Also, a pad for attachment onto conventional bicycle seats was introduced a few years ago by Spenco Medical Corp. The Spenco pad is believed to be made from a gel material of the type disclosed in Nelson U.S. Pat. No. 3,020,260 and in Spence U.S. Pat. Nos. 3,308,491 and 3,548,420. It is believed that the Spenco pad has not entirely relieved the rider's localized pressures associated with the bicycle seats on which it has been applied because the gel material has been used in an uncontrolled manner.

Thus, despite substantial prior efforts a need still exists for further improvements in bicycle seat construction based on anatomical and functional considerations, particularly for use on performance bicycles which are ridden for extended periods of time over long distances.

SUMMARY OF INVENTION

The present invention provides an improved anatomical multilayer seat for use on bicycles and the like, the seat incorporating a relatively thin layer of a constrained and preferably encapsulated soft gel material. The gel material layer is constrained and controlled in a manner to provide improved cyclist comfort during long-distance riding without loss of leg driving force or thrust by the rider. It has been found that if the gel material layer is interposed in the seat, in a thin layer in selected areas and is appropriately constrained laterally and controlled during use, an improved and more comfortable bicycle seat construction results.

The bicycle seat assembly basically comprises a formed substantially rigid conventional contoured lower shell, having a narrow forwardly extended front portion and a relatively wide rear portion both extending downwardly along the side and back portions of the seat. A conventional flexible cover sheet covers the shell and is firmly attached to the shell around its entire periphery, such as by gluing. Interposed between the shell and cover is a thin layer of soft resilient gel material centrally located above the substantially horizontally extending portions of the shell, so that the gel layer is positioned opposite the ischial pelvic or sitting bones and genital area of a rider's body, but without any appreciable gel material being provided on the downwardly extending portions of the seat shell. The gel layer is preferably encapsulated. A foam plastic material is also interposed between the seat cover and shell to surround and laterally constrain the gel material.

According to the invention, the soft gel layer used has a hydrostatic characteristic such that under downward pressure it is capable of flowing laterally only to a minor extent and when the pressure, is released the gel layer returns to its original shape due to the presence of internal restoring forces within the gel. The thickness of the gel layer provided in the multilayer seat construction and its lateral movement is minimized to provide the cyclist firm contact with the seat since excessive body movement relative to the seat causes abrasion and soreness. Also, if excessive gel or other padding material is provided in the seat, the resulting continuous movement of the rider's body causes a loss of positive leg driving force or thrust to the bicycle pedals, as some of the force is lost due to the intermittent periodic compression of the seat padding. The gel materials useful in this invention are organosiloxane compounds such as described in Nelson U.S. Pat. Nos. 3,020,260 and Spence U.S. Pat. 3,308,491, which are incorporated herein by reference to the extent needed. These gel materials are soft, tacky, non-friable and non-flowing. The materials used for the shell, plastic foam layer and seat cover are the conventional materials currently used and well-known to those skilled in the bicycle seat art.

The gel layer should be constrained against any appreciable lateral movement relative to the shell and be of a thickness and in a location which permits only limited up and down deflection. It has been found that the thin gel layer should be located below the cyclists' ischial pelvic or sitting bones and genital areas, and if the gel layer extends downwardly onto the sloping side portions of the seat, it will undesirably cause excessive movement for the rider along with rubbing and chafing of the skin. The gel layer should have sufficient thickness to provide adequate deformation to relieve excessive pressure on the pelvic bones so as to provide a comfortable ride. Excessive gel thickness, however, permits undesirable lateral and vertical movement which is detrimental to rider comfort and rider peddling efficiency. It has been found that the gel layer maximum thickness at the seat central portion should be at least about 0.250 inch, and tapers gradually to a lesser thickness near the seat periphery, and usually need not exceed about 0.500 inch.

A layer of relatively firm plastic foam is advantageously and preferably provided between the seat shell and the flexible cover to provide additional resilient support for the rider and for constraining the gel layer. The foam layer preferably has a cavity which is shaped to receive and hold the gel layer so that the gel layer is enclosed on its bottom and side surfaces and constrained against substantial lateral movement by the sides of the foam layer cavity. The gel layer may also be laid directly on the shell so that the firm plastic foam layer encloses the top and sides of the gel layer or it may be embedded in the firm plastic foam layer.

Also, if desired, a second or upper thin layer of a plastic foam, fabric or rubber material can be advantageously provided between the gel layer and the cover sheet. This second foam or rubber layer may have less density and greater resiliency and softness than the first or lower plastic foam layer but preferably is made of a thin plastic foam or rubber material which has a minimum deformation in the lateral direction and is capable of being bonded to the first or lower plastic foam layer. This multilayer seat construction thus provides a means of encapsulating and constraining the gel layer against substantial lateral movement during use by a rider.

The present invention also includes a method used for constructing an anatomical multilayer seat for a bicycle. According to the method, the lower rigid shell is first conventionally formed to a desired curved shape. The upper surface of the seat shell then serves as one side or part of a mold onto which the first or lower layer of plastic foam material is advantageously formed. A rigid mold having the desired upper shape of the seat is provided to form the other side or part the mold which mates with the seat shell mold thereby forming a central mold cavity therebetween. Depending on the desired placement of the gel layer, the seat shell may serve as the upper or lower mold part. Thus, if the gel layer in the finished seat is desired to be laterally constrained by the upper portion of the first foam layer (between the cover and the first foam layer) the seat shell mold serves as the upper mold. If the gel layer is desired to be constrained by the lower portion of the first foam layer (between the shell and the first foam layer), the seat shell mold serves as the lower mold. The plastic foam material is sprayed or injected into the central mold cavity and permitted to cure. The gel material is either inserted before or after the spraying or injection of the foam material, depending on the particular construction desired as more fully set forth hereafter. A flexible cover sheet, which has been cut to have a proper shape and size so as to cover the gel layer, first foam layer and the seat shell and provide a uniform margin around the seat shell edges, is placed over the centrally located gel layer and the cured first foam layer and stretched tightly as needed to provide a smooth fit. The periphery of the cover sheet is folded under the edge of the seat shell, and the cover edge is attached firmly to the shell, such as by gluing.

When it is desired to provide a second or upper layer of foam or other resilient material in the multilayer seat, such a second layer is first applied by tightly stretching or placing the material over the central gel layer and first foam layer and the second foam layer is preferably bonded onto the first foam layer. Then the cover sheet is attached as above and glued both to the second layer and the edge of the seat shell.

Important advantages of this invention are that the anatomical multilayer bicycle seat construction utilizing a thin constrained centrally located gel layer provides controlled and limited resilient deformation of the seat upper surface due to the gel layer incorporated into the seat, and thereby provides improved structural control for the multiple resilient layers of the seat. Also, the seat construction provides for graduated support and improved comfort for the rider, particularly for extended time periods of bicycle riding.

BRIEF DESCRIPTION OF DRAWINGS

This invention will be further described by reference to the following drawings, in which:

FIG. 1 shows a perspective view of a multilayer bicycle seat constructed according to the present invention;

FIG. 2 shows a side elevation view of the bicycle seat and support means for its attachment to a bicycle;

FIG. 3 shows a cross-sectional view of a touring seat embodiment of the bicycle seat taken at section 3—3 of FIG. 1, and including an encapsulated gel layer located between a first foam layer and the cover sheet;

FIG. 4 and FIG. 4a show alternative plan views of a gel layer used within the multilayer seat;

DESCRIPTION OF INVENTION

Figure 5:
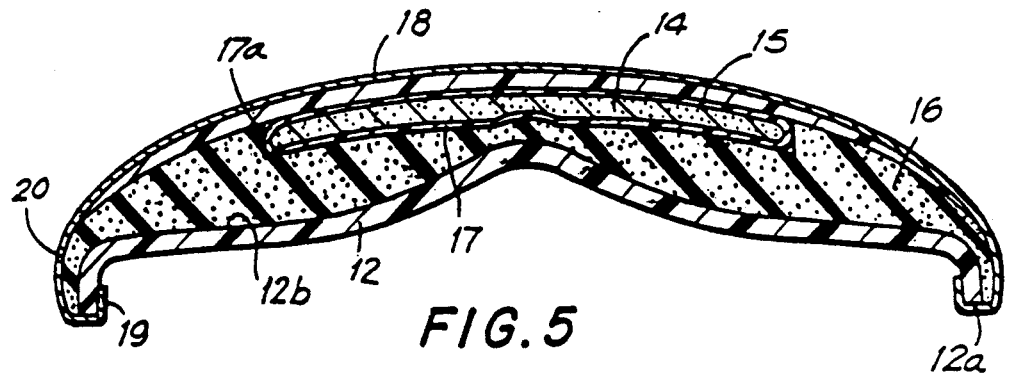
FIG. 5 shows a cross-sectional view of an alternative touring seat embodiment of the invention similar to FIG. 3, but including a thin second foam layer located above the gel layer.

Referring now to the drawings, FIG. 1 shows a perspective view of the upper side of the improved bicycle seat according to the present invention. The seat 10 has a generally conventional contour or shape, as further shown by FIG. 2, and is provided on its lower side with a formed substantially rigid shell 12 made of a molded plastic material. The shell is preferably molded nylon or polyethylene plastic having a thickness of 0.065–0.080 inch. The shell is provided on its lower side with appropriate attachment means 13 as partially shown in FIG. 2 for attaching the seat rigidly onto a bicycle frame, such as dual attachment bar means rigidly attached to the lower side of the seat shell at its front and rear ends for clamping the seat onto a frame post of a bicycle (not shown).

Figure 6:
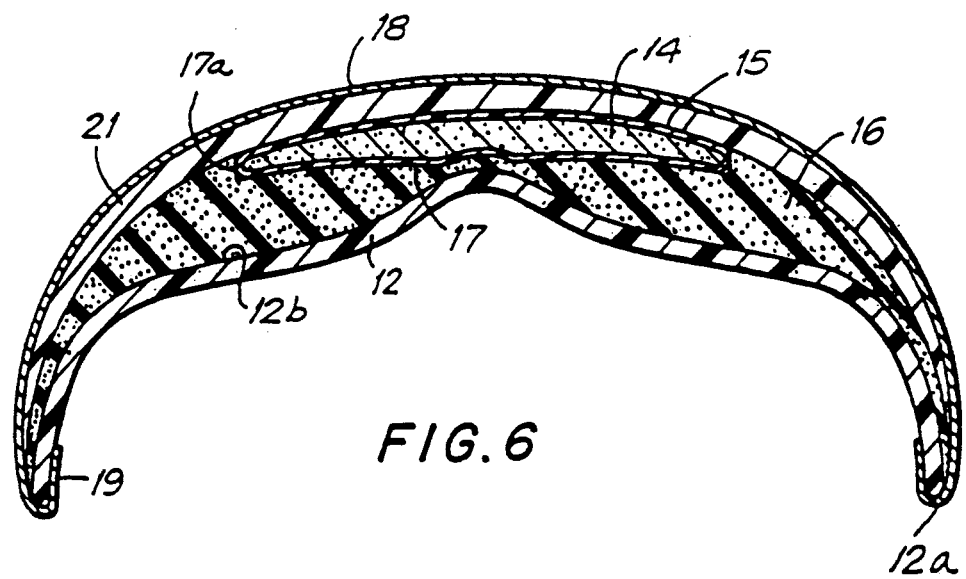
FIG. 6 shows a cross-sectional view of a racing seat embodiment of the bicycle seat of the present invention similar to FIG. 5 utilizing two layers of plastic foam enclosing the gel layer.
Figure 7:
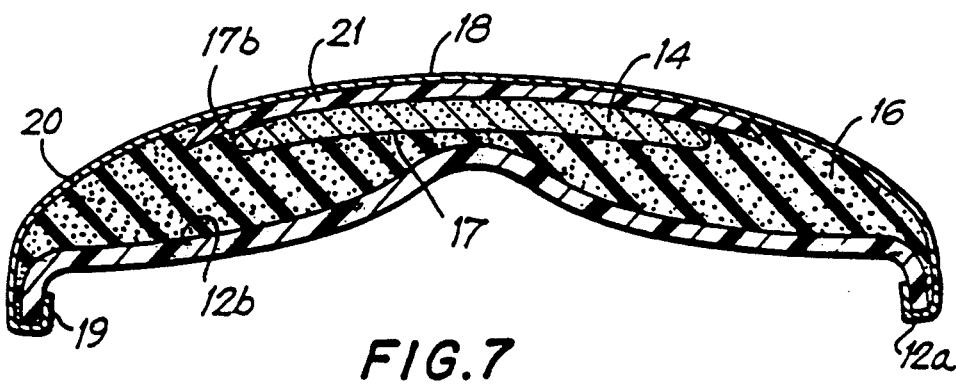
FIG. 7 shows a cross-sectional view of an alternative touring seat embodiment of the invention similar to FIG. 5 but including a gel layer that is encapsulated without a polyethylene packet.
Figure 8:
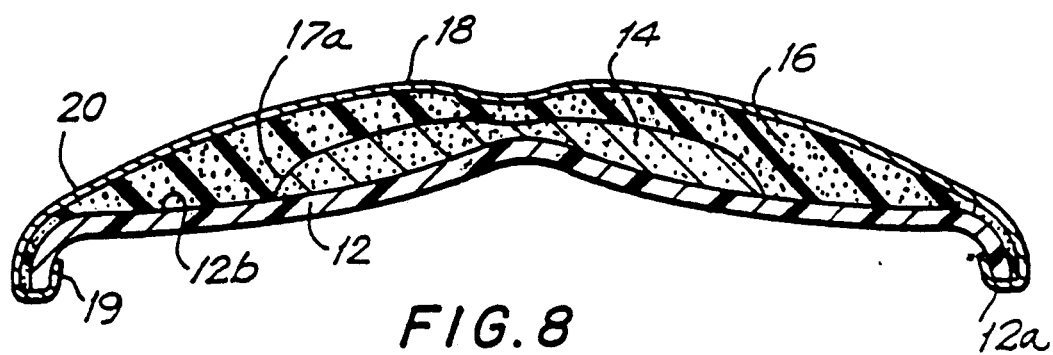
FIG. 8 shows a cross-sectional view of another touring seat embodiment of a bicycle seat having the gel layer adjacent the shell.
Figure 9:
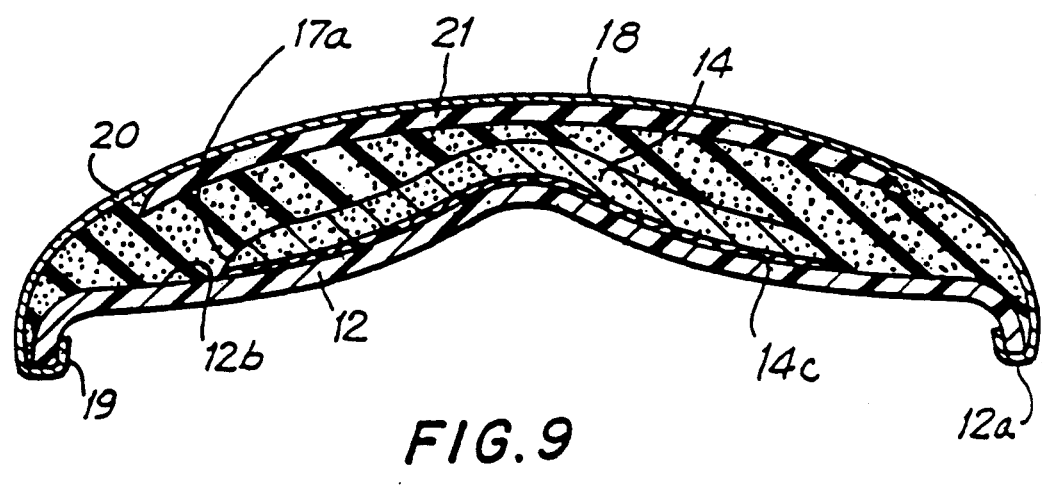
FIG. 9 shows a cross-sectional view of a racing seat embodiment of the bicycle seat of the present invention similar to FIG. 7, but including a mesh substrate attached to the bottom of the gel layer and a rubberized sheet above the gel layer.

FIGS. 3, 5 and 6 show a cross-sectional view of a touring bicycle seat and racing seat embodiment of the multilayer seat construction taken at section 3—3 of FIG. 1. The substantially rigid curved lower shell 12 is formed generally as shown with downturned peripheral edges 12a. A layer 14 of soft resilient gel material such as an organosiloxane gel is centrally located within a relatively firm foam layer 16 above the upper surface of shell 12. The gel layer 14 may have a variable thickness as shown in FIG. 3 with a relatively thin central portion and thinner sides which terminate short of periphery 12a of the seat shell 12. It has been found under certain conditions the entry of moisture into the gel may cause deterioration of the organosiloxane gel material. Thus, the gel layer 14 may be enclosed within a moisture-impervious film 15 such as polyethylene as shown in FIG. 4 shaped as generally shown in FIG. 4 and FIG. 4a, alternatively, the gel layer 14 may be used without the film 15 as shown in FIGS. 7, 8 and 9. The gel layer 14 has a general shape as shown by FIG. 4 and FIG. 4a which is similar to the upper surface of the seat 10, and may be formed on a mesh substrate 14a. The gel layer is generally located in the seat central region so as to be positioned opposite the ischial pelvic bones and genital area of a rider, as generally shown by dotted lines 14a of FIG. 1. The gel layer need not be enclosed in the plastic film 15 when kept sufficiently moisture resistant, as shown in FIGS. 7, 8 and 9.

As shown in FIG. 3, located between the gel layer 14 and seat shell 12 is a first foam layer 16 of relatively firm plastic foam material which is bonded onto the upper surface 12b of the shell 12. As shown in FIGS. 3, 5 and 6, foam layer 16 is molded so that its upper surface has a cavity 17 which is shaped for receiving and constraining the gel packet 14. The sides 17a of cavity 17 should have an angle with the bottom of the cavity not exceeding about 90°, and preferably should be 60-90°, for effectively constraining the gel layer 14 along its sides against lateral movement. The foam layer 16 as shown has a variable thickness, the maximum thickness being about 0.50 inch in the central portion and tapers gradually to a thickness of only about 0.020 inch near the peripheral edge and finally feathers into a smooth surface with the shell 12.

As shown in FIG. 3, a flexible cover sheet 18 is provided for covering the first foam layer 16 and is folded over edge 12a of the shell 12 and bonded at 19 and 20 to the periphery of the seat shell 12 and foam layer 16, respectively. The cover sheet material 18 is made of a flexible strong material such as leather or polyvinyl chloride plastic sheet material having a thickness of 0.020-0.040 inch.

In the method for constructing the multilayer bicycle seat shown in FIG. 3, the rigid shell 12 is conventionally formed and the formed convex side is then used as one side of a two-piece mold. A rigid mold part having the desired upper side shape of the seat and including a projection upon which the cavity 17 and cavity edges 17a are formed is provided to mate with the shell 12 mold part. The first foam material is then sprayed or injected into the mold cavity. After the foam has cured, the rigid mold part is removed leaving the first foam layer having a cavity 17 and cavity edges 17a adhered to the shell convex surface 12b. Next, the gel packet 14-15 is placed in the central cavity 17 and the flexible cover sheet 18 stretched tightly over the gel packet 14-15, the first foam layer 16 and the shell edges 12a and attached to the foam layer 16 at shell peripheral edges 12a by gluing.

Alternative embodiment multilayer seat constructions are shown by FIGS. 5 and 6. In these multilayer constructions a second or upper foam layer 21 provides a resilient cushion support for the rider and an intermediate cover for the gel layer 14. The second foam layer 21 has a relatively uniform thickness as shown and is usually made of open-celled polystyrene foam. The first foam layer has a greater density and rigidity than the second foam layer.

FIG. 6 shows a racing seat embodiment of the multi layer seat construction of FIG. 5, in which the seat outer contour is made more rounded. Also, the thickness of gel layer 14 and foam layers 16 and 21 are usually somewhat less than that shown for the FIGS. 3 and 5 seat embodiments.

Another useful embodiment of the multilayer seat construction is depicted by FIG. 7, in which the construction is similar to the FIG. 5 embodiment, except that the organosiloxane gel layer 14 is provided without a plastic film as is used in the FIG. 5 embodiment. Instead, a second layer 21 made of a strong material having a high tensile strength which has little lateral stretch is placed over gel layer 14 and bonded onto the first foam layer 16. The cover 18 is applied tightly over and glued onto the second layer 21 and onto the seat periphery at 19. Thus, the organosiloxane gel layer 14 is firmly encapsulated and constrained between the first foam layer 16 and the second layer 21 and seat cover 18. The inclusion of the second layer 21 functions to encapsulate the gel layer 14 and minimizes lateral movement of both the gel layer 14 and the cover 18.

The embodiment shown in FIG. 7 is constructed in a manner similar to that described for FIG. 5 except that the rigid mold is not provided with the projection for forming the cavity 17 and cavity edges 17b. Instead, the rigid mold is formed having the desired upper shape of the seat and is used as the lower mold. Thereafter, the second layer 21 and unsheathed gel layer 14 are placed in the correct position on the rigid mold, the upper convex shell mold mated thereto, and then the foam material for forming the first foam layer 16 sprayed and injected therein. In this embodiment, the foam material forms its own cavity around the bottom and sides of the gel layer 14 in situ during the spraying or injection and curing steps. The cavity edge 17a formed in this method is a smooth surface between the gel layer 14 and the first foam material 16, as shown in FIG. 7. The second layer 21 is bonded to the first foam material 16 over the cavity edges 17b and forms an encapsulating pocket which prevents moisture penetration. This formed combination, moreover, provides for extremely smooth surfaces at the cavity edges which lessens any rider discomfort caused by the change in materials.

Another alternative touring seat embodiment of the invention is shown by FIG. 8. In this seat construction, gel layer 14 is located adjacent the shell 12 and is covered by first foam layer 16. The gel layer 14 is thus encapsulated and constrained by the shell 12 and the first foam material 16. The multilayer seat shown in FIG. 8 is manufactured in a manner similar to that described for the embodiment shown in FIG. 7 except that the convex upper surface of the shell 12 is used as the lower mold and the unsheathed gel layer 14 is placed on the shell 12 rather than the rigid mold. The central mold cavity is formed in the manner described for FIG. 7. The spraying or injection of the foam material is also accomplished as described for FIG. 7 except the gel layer 14 is encapsulated between the shell 12 and the first foam layer 16 and no second foam layer is used.

Still another alternative touring seat embodiment of the invention is shown in FIG. 9 which is constructed in a similar manner to that described for FIG. 7 except that the first foam layer 16 is present in a lesser amount compared to the other embodiments and encloses the gel layer 14 on its sides. The gel layer 14 is initially formed over a nylon mesh substrate 14a which rests on the seat shell 18. In this construction a vulcanized rubber compound is used as the material for the second layer 21. The resultant multilayer seat structure is generally thinner than those described for the other embodiments. The curing of the sprayed or injected polyurethane first foam material involves a polymerization process which, because of the use of a vulcanized material as the second layer 21, causes the edges of the second layer 21 in contact with the first foam layer 16 to bond. Thus, in a manner similar to that described for FIG. 7, the gel layer 14 is encapsulated by the combination of the first foam layer 16, the second layer 21 and the upper surface of the seat shell 12. This formed combination provides extremely smooth surfaces at the cavity edges which lessens any rider discomfort caused by the change in materials. The use of the second layer 21 directly above the gel layer 14 also gives the finished seat construction a soft feel to the touch.

Although this invention has been described broadly and in terms of various preferred embodiments, it will be apparent that modifications and variation can be made and that some features can be used without others as defined by the following claims.

I claim:

1. A method for constructing an anatomical multilayer bicycle-type seat having a lower rigid shell, a flexible outer cover sheet, and an encapsulated gel layer located between said shell and said outer cover sheet, the method comprising the steps of:
    (a) providing an upper surface of a formed relatively rigid lower shell as a first mold surface;
    (b) providing a rigid shaped object having a desired upper surface shape of said seat as a second mold surface;
    (c) forming a mold cavity with said first and second mold surfaces;
    (d) forming a cured foam or rubber-like material layer in said mold having a central cavity;
    (e) including a soft resilient gel layer in said central cavity so as to engage at least two lateral edges of said gel layer to constrain the gel layer against substantial lateral movement; and
    (f) placing a flexible cover sheet over said foam and gel layers after separating said mold surfaces and attaching said cover sheet firmly onto the periphery of said shell, whereby said gel layer is constrained against substantial lateral movement and is permitted only limited vertical deflection.

2. The method according to claim 1, further comprising the step of placing a layer of resilient material above the encapsulated gel layer before attaching the flexible cover sheet.

3. A method for constructing an anatomical multilayer bicycle-type seat having a lower rigid shell, a flexible outer cover sheet, and an encapsulated soft, resilient gel layer between said shell and said flexible outer cover sheet, said method comprising the steps of:
    (a) providing a first mold half;
    (b) placing a resilient layer on the first mold half;
    (c) placing said gel layer on said resilient layer;
    (d) placing said rigid shell, acting as a second mold half above the first mold half to form a cavity;
    (e) injecting a foam or rubber-like material into said cavity;
    (f) curing the foam material;
    (g) removing the first mold half; and
    (h) attaching a flexible cover sheet firmly to the periphery of said shell;
    whereby the gel layer is constrained on at least two edges by said foam material against substantial lateral movement and is permitted only limited up-and-down vertical deflection by at least said shell and said cover sheet.

4. The method according to claim 3 wherein said resilient layer is adhered to said injected foam or rubber-like material at least at the edges of said gel layer.

5. The method according to claim 4 including the step of disposing said gel layer above a mesh substrate before placing said gel layer on said resilient layer.

6. A method for constructing an anatomical multilayer bicycle-type seat having a lower rigid shell, a flexible outer cover sheet, and an encapsulated gel layer located between said shell and said outer cover sheet, the method comprising the steps of:
    (a) providing an upper surface of a formed relatively rigid lower shell as a first mold surface;
    (b) providing a rigid shaped object having a desired upper surface shape of said seat as a second mold surface;
    (c) forming a mold cavity with said first and second mold surfaces;
    (d) forming a cured foam or rubber-like material layer in said mold having a central cavity;
    (e) including a soft resilient gel layer in said central cavity so as to engage at least two lateral edges of said gel layer to constrain the gel layer against substantial lateral movement; and
    (f) placing a flexible cover sheet over said foam and gel layers after separating said mold surfaces and attaching said cover sheet firmly onto the periphery of said shell, wherein said gel layer is constrained against substantial lateral movement and is permitted only limited vertical deflection wherein steps (c), (d), (e) and (f), comprise:
    first placing said gel layer on the upper surface of said shell acting as said first mold surface;
    placing said second mold surface above said first mold surface to form a cavity therebetween;
    injecting said foam or rubber-like material into said cavity between said mold surfaces;
    curing said foam or rubber-like material; and
    removing subsequently said second mold surface.

7. A method for constructing an anatomical multilayer bicycle-type seat having a lower rigid shell, a flexible outer cover sheet, and an encapsulated gel layer located between said shell and said outer cover sheet, the method comprising the steps of:
    (a) providing an upper surface of a formed relatively rigid lower shell as a first mold surface;
    (b) providing a rigid shaped object having a desired upper surface shape of said seat as a second mold surface;

(c) forming a mold cavity with said first and second mold surfaces;
(d) forming a cured foam or rubber-like material layer in said mold having a central cavity;
(e) including a soft resilient gel layer in said central cavity so as to engage at least two lateral edges of said gel layer to constrain the gel layer against substantial lateral movement;
(f) placing a layer of resilient material above the foam-encapsulated gel layer;
(g) placing a flexible cover sheet over said foam and gel layers after separating said mold surfaces and attaching said cover sheet firmly onto the periphery of said shell, wherein said gel layer is constrained against substantial lateral movement and is permitted only limited vertical defection; and
wherein steps (c), (d), (e) and (g), comprise first placing said gel layer on the upper surface of said shell acting as said first mold surface;
placing said second mold surface above said first mold surface to form a cavity therebetween;
injecting said foam or rubber-like material into said cavity between said mold surfaces;
curing said foam or rubber-like material; and
removing subsequently said second mold surface.

8. A method for constructing an anatomical multilayer bicycle-type seat having a lower rigid shell, a flexible outer cover sheet, and an encapsulated gel layer located between said shell and said outer cover sheet, the method comprising the steps of:
  (a) providing an upper surface of a formed relatively rigid lower shell as a first mold surface;
  (b) providing a rigid shaped object having a desired upper surface shape of said seat as a second mold surface;
  (c) forming a mold cavity with said first and second mold surfaces;
  (d) forming a cured foam or rubber-like material layer in said mold having a central cavity;
  (e) including a soft resilient gel layer in said central cavity so as to escape at least two lateral edges of said gel layer to constrain the gel layer against substantial lateral movement; and
  (f) placing a layer of resilient material above the foam-encapsulated gel layer;
  (g) placing a flexible cover sheet over said foam and gel layers after separating said mold surfaces and attaching said cover sheet firmly onto the periphery of said shell, wherein said gel layer is constrained against substantial lateral movement and is permitted only limited vertical deflection, wherein steps (c), (d), (e) and (g) comprise:
  placing said resilient layer on said second mold surface;
  placing said gel layer on top of said resilient layer;
  placing said mold surface above said second mold surface to form a cavity therebetween;
  injecting a foam material into said cavity and curing the foam material; and
  removing said second mold surface.

9. A method for constructing an anatomical multilayer bicycle-type seat having a lower rigid shell, a flexible outer cover sheet, and an encapsulated gel layer located between said shell and said outer cover sheet, the method comprising the steps of:
  (a) providing an upper surface of a formed relatively rigid lower shell as a first mold surface;
  (b) providing a rigid shaped object having a desired upper surface shape of said seat as a second mold surface;
  (c) forming a mold cavity with said first and second mold surfaces;
  (d) forming a cured foam or rubber-like material layer in said mold having a central cavity;
  (e) including a soft resilient gel layer in said central cavity so as to engage at least two lateral edges of said gel layer to constrain the gel layer against substantial lateral movement;
  (f) placing a layer of resilient material above the foam-encapsulated gel layer;
  (g) placing a flexible cover sheet over said foam and gel layers after separating said mold surfaces and attaching said cover sheet firmly onto the periphery of said shell, whereby said gel layer is constrained against substantial lateral movement, wherein steps (c), (d), (e) and (g) comprise
  placing said first mold surface above said second mold surface to form a cavity therebetween;
  injecting said foam or rubber-like material into said cavity;
  curing said foam material;
  removing said second mold surface; and
  placing a gel packet into said depression.

10. A method for constructing an anatomical multilayer bicycle-type seat having a lower rigid shell, a flexible outer cover sheet, and an encapsulated gel layer located between said shell and said outer cover sheet, the method comprising the steps of:
  (a) providing an upper surface of a formed relatively rigid lower shell as a first mold surface;
  (b) providing a rigid shaped object having a desired upper surface shape of said seat as a second mold surface;
  (c) forming a mold cavity with said first and second mold surfaces;
  (d) forming a cured foam or rubber-like material layer in said mold having a central cavity;
  (e) including a soft resilient gel layer in said central cavity so as to engage at least two lateral edges of said gel layer to constrain the gel layer against substantial lateral movement;
  (f) placing a flexible cover sheet over said foam and gel layers after separating said mold surfaces and attaching said cover sheet firmly onto the periphery of said shell, whereby said gel layer is constrained against substantial lateral movement and is permitted only limited vertical deflection, and wherein said layer of resilient material is placed prior to attaching of the flexible cover sheet, wherein said steps (c), (d), (e) and (f) comprise:
  providing said second mold surface with a downward projection shaped to form a depression corresponding to the desired shape of said gel layer;
  placing said first mold surface above said second mold surface to form a cavity therebetween;
  injecting said foam or rubber-like material into said cavity;
  curing said foam or rubber-like material;
  removing said second mold surface; and
  placing a gel packet into said depression.

* * * * *